United States Patent [19]

McLandrich

[11] 4,352,563

[45] Oct. 5, 1982

[54] METHOD OF PROVIDING PHASE BIASING IN A CONTINUOUS SINGLE-MODE FIBER RING INTERFEROMETER

[75] Inventor: Matthew N. McLandrich, Oceanside, Calif.

[73] Assignee: The United States of America as represented by the Secretary of the Navy, Washington, D.C.

[21] Appl. No.: 189,497

[22] Filed: Sep. 22, 1980

[51] Int. Cl.³ .............................................. G01B 9/02
[52] U.S. Cl. ................................................... 356/350
[58] Field of Search .............................. 356/350, 356; 350/96.29, 353

[56] References Cited

U.S. PATENT DOCUMENTS

| 3,464,027 | 8/1969 | De Maria | 331/94.5 M |
| 4,068,191 | 1/1978 | Zemon et al. | 331/94.5 M |
| 4,280,766 | 7/1981 | Goss et al. | 356/350 |
| 4,291,984 | 9/1981 | Albares | 356/350 |

OTHER PUBLICATIONS

"Fiber-Optic Rotation Sensing with Low Drift", Ulrich, Optics Letters, vol. 5, No. 5, May 1980, pp. 173-175.

"Ultrasonic Transducer Materials", O. E. Mattiat, 1971.

*Primary Examiner*—Vincent P. McGraw
*Attorney, Agent, or Firm*—Robert F. Beers; Ervin F. Johnston; Thomas Glenn Keough

[57] ABSTRACT

A fiber interferometer gyro employing a continuous, integral looped single-mode fiber is coupled to bidirectionally transmit clockwise and counterclockwise pulsed beams of light through a coiled continuous integral single-mode fiber from a laser to a pair of detectors. A suitably polarized piezoelectric cylinder is fitted about a portion of the continuous integral single-mode fiber to change the refractive index of that portion of the continuous integral single-mode fiber when appropriate electric fields are impressed across it. Changing the refractive index in only that portion of the continuous integral single-mode fiber results a selective phase biasing between the clockwise and counterclockwise traveling pulsed beams so that a rotation displacement of the interferometer gyro is more easily detected. This enhanced capability does not compromise the interferometer's effectiveness since its integral, continuous path is not broken nor are other elements introduced in the light pathway provided by the continuous single-mode fiber.

2 Claims, 4 Drawing Figures

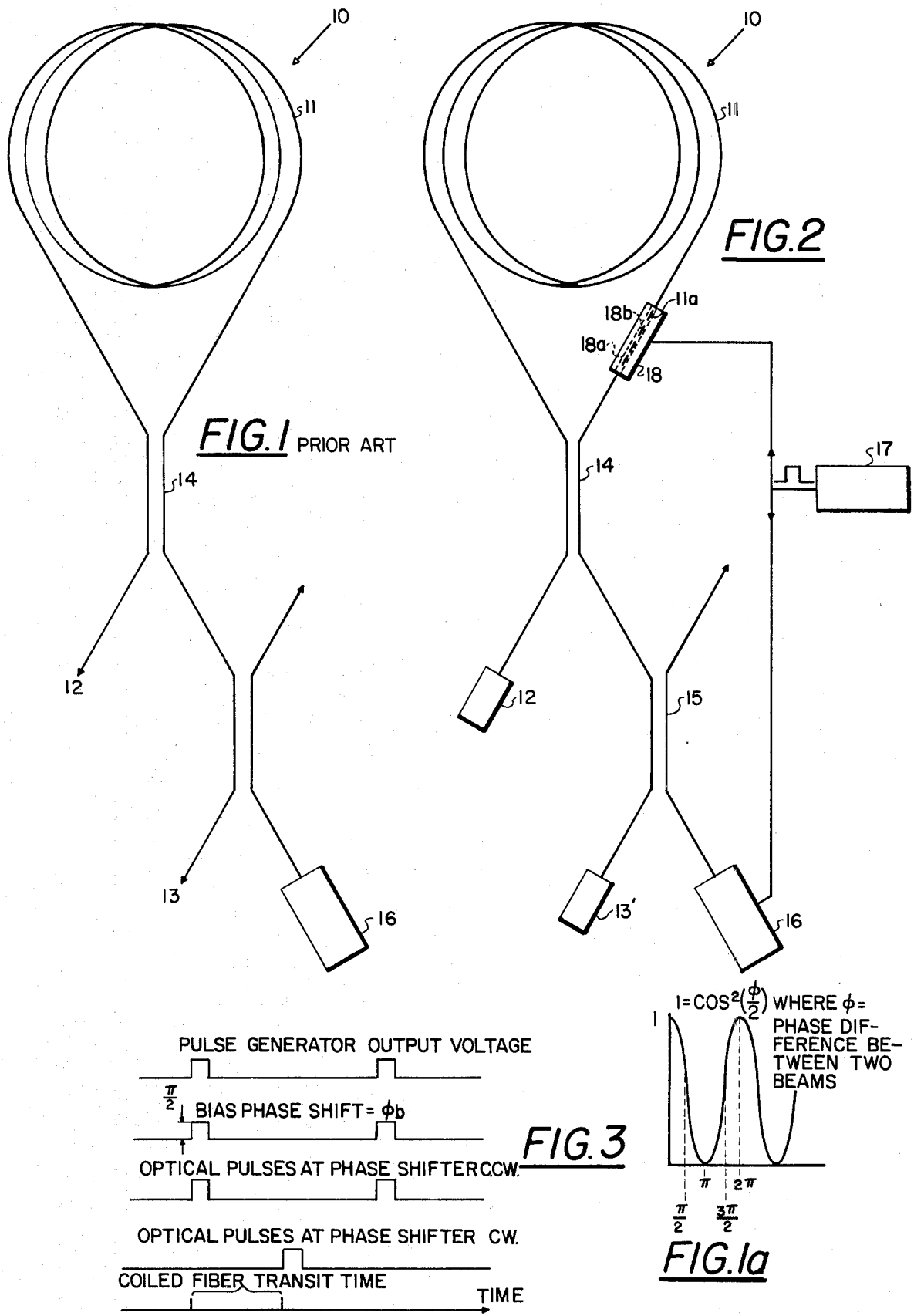

METHOD OF PROVIDING PHASE BIASING IN A CONTINUOUS SINGLE-MODE FIBER RING INTERFEROMETER

STATEMENT OF GOVERNMENT INTEREST

The invention described herein may be manufactured and used by or for the Government of the Unites States of America for governmental purposes without the payment of any royalties thereon or therefor.

BACKGROUND OF THE INVENTION

A growing number of reference devices are finding a more wide acceptance among designers looking for accurate, reliable, relatively inexpensive and compact indicators of rotational motion. The recently developed ring gyros are being employed in a number of aircraft and missiles and have demonstrated sufficient accuracy to make them commercially attractive. An emerging family of fiber interferometers appears to have even more potential because of their increased sensitivity, reduced susceptibility to mechanical and thermal influences and their economical considerations. A particularly promising design was disclosed in a publication by V. Vali and R. W. Shorthill and entitled "Fiber Laser Gyroscopes". This idea was presented at the East Coast Conference SPIE in Reston, Virginia on Mar. 22 and 23 of 1976. Clockwise and counterclockwise beams of coherent light bidirectionally travel through a coiled single-mode fiber. The beams are recombined by suitable detectors which provide information representative of a relative rotational displacement by the device. The Vali-Shorthill approach had a number of lenses and beam splitters that had to be precisely aligned and, consequently, it was vulnerable to the temperature changes and vibrations of its surroundings.

An improvement on the concept advocated by Vali and Shorthill formed the subject matter of a pending U.S. Patent and Trademark Application Ser. No. 014,798, entitled "3 dB Single-Mode Optical Fiber Interferometer Beam Splitter Coupler" by Matthew N. McLandrich. The inventor sought to reduce the number of components susceptible to ambient influences. His integral, unitized, continuous interferometer reduced the problems associated with a number of dissimilar elements joined together. However, as with all endeavors, it was noted that even further improved performance might be provided for by phase shifting between the counterrotating beams of light.

Phase shifting between counterrotating beams in an inertial reference device was anticipated by Jack B. Speller in his U.S. Pat. No. 3,395,270 entitled "Relativistic Inertial Reference Device". Kerr cells are included interposed in the light beam path to shift the relative phase between the countercirculating beams and hope to provide a more responsive readout. Inclusion of the Kerr cells along with the associated beam splitters, lenses and physically separated quartz loop collectively may create more drawbacks than optimistically could be compensated by the Kerr cells. The many breaks in the optical path between the source of light and the sensors all erode this type of a referencing device's ability to function properly.

Thus there is a continuing need of the state-of-the-art for an improvement to the single-mode fiber interferometer gyro which enhances the performance of the integral fiber interferometer by providing for phase biasing of its counterrotating beams yet does not compromise its inherent capabilities including being a unitized continuous device for assuring responsive indications of rotational motion.

SUMMARY OF THE INVENTION

The present invention is directed to providing an improvement for a fiber interferometer gyro having a continuous integral looped single-mode fiber coupled to bidirectionally transmit pulsed beams of light from a laser to at least one detector. A means is contiguously disposed about the continuous integral single-mode fiber for changing the refractive index of a portion of the continuous integral single-mode fiber to introduce phase biasing between the counterrotating light beams. A method for improving the performance of the fiber interferometer gyro having a continuous integral looped single-mode fiber coupled to bidirectionally transmit beams of light from a laser to at least one detector calls for there being a biasing of the relative phase differences between the bidirectionally transmitted beams by changing the refractive index of a portion of the continuous integral single-mode fiber by the placing of a piezoelectric material about the portion of the continuous integral single-mode fiber and impressing responsive electric potentials across it.

A prime object of the invention is to improve the capabilities of the fiber interferometer gyro.

Another object of the invention is to assure more reliable operation of the fiber interferometer gyro without compromising its integral continuous pathway created by the continuous single-mode fiber.

Still another object of the invention is to provide for increased capability by introducing relative phase shifting of the countercirculating beams of light passing through the interferometer gyro.

Yet another object of the invention is to introduce relative phase shifts between the countercirculating beams in the interferometer gyro by altering the refractive index of a portion of the interferometer gyro's single-mode fiber.

Still another object of the invention is to provide a device and method for phase biasing the countercirculating beams that does not interrupt the light beam path.

Yet another object of the invention is to include a piezoelectric cylinder contiguously abutting a portion of the continuous integral single-mode fiber to change the refractive index thereof and the phase biasing of the countercirculating beams thereby.

A further object is to change the refractive index of a continuation of one incoming leg of a coiled single-mode fiber on an intermittent basis to assure relative phase biasing between countercirculating beams of light to facilitate detection.

These and other objects of the invention will become more readily apparent from the ensuing description when taken with the appended claims and drawings.

BRIEF DESCRIPTION OF THE DRAWINGS

FIG. 1 depicts a prior art interferometer.

FIG. 1a demonstrates a representative characteristic of the interferometer gyro's detectors.

FIG. 2 shows the improved interferometer gyro of the present invention.

FIG. 3 depicts the relative waveforms.

DESCRIPTION OF THE PREFERRED EMBODIMENTS

Referring to FIG. 1 of the drawings a prior art fiber interferometer as conceived by Matthew N. McLandrich and copending in the U.S. Patent and Trademark Office in Application Ser. No. 014,789 is entitled "3 dB Single-Mode Optical Fiber Interferometer Beam Splitter/Coupler". Briefly the interferometer 10 has a single-mode fiber 11 looped or coiled on itself. The length of the fiber can be in the order of a few kilometers long to assure suitable sensitivity for low rotation rates. The theory and operation of the fiber interferometer have been firmly established in the art and elaboration is dispensed with to avoid belaboring the obvious.

The interference fringes observed at points 12 and 13 (or detected by photodetectors and fed to a differential amplifier) are due to rotation and changes in the rates of rotation in the interferometer. The detectors provide indications of the output fringe intensity that occurs when two beams (in this case, light) of equal intensity interfere. A mathematical relationship of how the fringe intensity can be predicted is shown in FIG. 1a where $\phi$ represents the total phase difference between the intensities of the two beams. The total intensity is made up of $\phi_\omega$, $\phi_o$ and $\phi_b$ where:

$\phi_\omega$ = the phase shift due rotation of the interferometer
$\phi_o$ = phase shifts that result from the coupling operation through beamsplitter/couplers and
$\phi_b$ = bias phase shift introduced by phase shifting means.

It is intended to introduce a phase shift
$(\pi/2)$ = magnitude of phase shift $\phi_b$ of optical pulses at phase shifter.

A pair of beamsplitter/couplers 14 and 15 couples coherent light from a laser 16 through the looped single-mode fiber 11 and back to detectors at observation points 12 and 13. The optical paths taken by the countercirculating beams of coherent light from the laser to the detectors are without interruption. To repeat, an unbroken continuous pathway extends through the single-mode fiber to allow responsive monitoring of the interference fringes at the observation points. The optical signals emanating from the lasers are split into two equal power signals without any phase altering by an evanescent energy transfer which bidirectionally are fed to and are extracted from the continuous integral single-mode optical fiber. The operation of both the beamsplitter/couplers is the 3 dB single-mode coupling of the $HE_{11}$ mode between adjacent optical single-mode fibers and is more thoroughly discussed in the above referenced copending patent application.

The uninterrupted pathway taken by the two countercirculating beams relies on evanescent energy transfer within the single-mode couplers by their having adjacent single-mode fibers lying adjacent each other a predetermined length at a distance which is a function of the frequency of interest, the energy transfer levels, the transmissive and dissipative properties of the materials, etc., to name a few.

The prior art single-mode fiber interferometer just described functions quite satisfactorily under a wide variety of conditions. However, since it relies on PIN photodetectors or, for that matter, other optical detectors, the signals that it provides can be expressed as a mathematical function $\cos^2(\phi/2)$ where $\phi$ is the total difference in phase between combined or interfering intensities of the two countercirculating beams, as described above.

Noting FIG. 1a, it is apparent that the outputs of the detector's relative intensities vary little when the phase differences are at or near $\pi$ radians or $2\pi$ radians. A slight phase variation caused by relative rotation of the fiber interferometer gyro will scarcely be noted since the detector's $\cos^2\phi$ difference will be only slightly changing. If, on the other hand, the phase of one signal could be biased so that its relative phase difference is $\pi/2$ from the other, a change in the relatively small change in the observable flux intensity (due to rotation of the interferometer) would be much more noticeable for a small variation between the two signals. In other words, small rotation rate changes of the fiber interferometer will be more observable if the relative phases of the two signals, the clockwise traveling signal and the counterclockwise traveling signal, are phase biased $\pi/2$ with respect to one another. Phase variations between the clockwise and counterclockwise beams attributable to rotation of the interferometer will be much more readily observable and monitorable at observation points 12 and 13.

In FIG. 2 like reference characters denote like elements. Detectors 12' and 13' are in place of the observation points 12 and 13 and a pulse generator 17 is added and is coupled to laser 16 and to a phase biasing means 18. The pulse generator actuates the laser and phase biasing means simultaneously, repetitively and at predetermined intervals, see FIG. 3. Specific sequences and timing relationships are essential to realize the improved performance of this inventive concept yet the exact fabrication of pulse generator is well within the scope of one skilled in the art.

The phase biasing means is a piezoelectric cylinder having an appropriately dimensioned axial bore 18a sized to accommodate the outer surface of a portion 11a of continuous integral single-mode fiber 11. Optionally, portion 11a of the integral coiled optical fiber is potted in the axial bore by a suitable cement 18b to assure a snug fit and to assure that compressive forces are transmitted to the portion of the fiber contained in the axial bore.

Piezoelectric or other ferroelectric materials are well known and have long functioned as transducers, gauges, etc. that either change their dimensions in response to an applied electric field or generate an electric signal representative of some sort of a mechanical deformation. In the present instance, the phase biasing means is an axially polarized piezoelectric cylinder having its opposite ends provided with conductive surfaces or foil like conductors so that when a pulse is impressed across the cylinder from pulse generator 17, an electric field causes a corresponding radial deformation of the piezoelectric element. Because of the proven properties of piezoelectric materials, for example, barium titanate, this deformation is translated into a very strong force which compresses portion 11a of the continuous integral single-mode fiber 11 contained in the phase biasing means. The pressure on portion 11a causes a responsive change in its refractive index and, hence, the velocity of propagation a light beam through phase biasing means 18. By suitably adjusting the magnitude and duration of the pulse, a relative phase shift of the counterclockwise traveling pulse relative to the clockwise pulse can be made to being $\pi/2$. To elaborate, since the laser is simultaneously actuated along with the phase biasing means, the clockwise traveling beam of light begins to pass through the coiled single-mode fiber 11 at the same time the counterclockwise pulse has its velocity of propagation and, therefore, its phase, biased $\pi/2$ radians with respect to the clockwise pulse.

Looking once again to FIG. 3, a relative phasing sequence shows that the actuating pulse from pulse generator 17 causes a responsive radial deformation of the phase biasing means 18 that changes the refractive index of portion 11a of continuous single-mode fiber 11. Coherent light emanating from laser 16 during the period of the shifting pulse passes through 3 dB beamsplitter/coupler 15 and 3 dB beamsplitter/coupler 14 and starts to travel through the coiled integral single-mode fiber 11 as a clockwise moving beam of pulsed light. Simultaneously a counterclockwise beam of pulsed light, the latter being shifted $\pi/2$ radians with respect to the clockwise beam of pulsed light, begins to travel in the opposite direction through integral single-mode fiber 11. The two beams take a coil traversal period of time equal to $\tau = nL/c$, where n is the refractive index of the fiber; L is the length of the coiled fiber and c is the speed of light. Thus, the clockwise and counterclockwise beams will arrive at the detectors later than the time when beams are transmitted into the fibers so that the detection of the output fringe intensities can be monitored at detectors 12' and 13'. Because the beams are shifted $\pi/2$ radians with respect to one another, as the intensities vary around $\pi/2$ radians, the relative changes are maximized and the observable variations attributable to rotation rate of the interferometer are enhanced.

The integral continuous light pathway assured by mounting the phase biasing means about a section of the single-mode fiber retains the unitized integrity of the interferometer. There are no breaks or splices or couplings or other mechanical or electromechanical contrivances that could compromise the intensities representative of phase relationships of the two counterrotating beams. Reliability is greatly enhanced by there being a simple maintenance of the unitized interferometer.

Obviously, many other modifications and variations of the present invention are possible in the light of the above teachings. It is therefore to be understood that within the scope of the appended claims the invention may be practiced otherwise than as specifically described.

What is claimed is:

1. In a unitized fiber interferometer gyro having a continuous integral looped single-mode fiber coupled to bidirectionally transmit beams of light from a laser to at least one detector, an improvement therefor is provided comprising:

a piezoelectric cylinder having a coaxial bore sized to contiguously and securely accommodate a portion of the continuous integral single-mode fiber in a bonded secure fashion and being fashioned from a material that exerts a compressive radially inwardly force on the portion of the continuous integral single-mode fiber in response to driving electric fields for changing the refractive index of a portion of the continuous integral single-mode fiber to impart a $\pi/2$ relative phase shift between the bidirectionally traveling light beams.

2. A method for improving the performance of a fiber interferometer gyro having a continuous integral looped single-mode fiber coupled to bidirectionally transmit beams of light from a laser to at least one detector comprising:

placing of a piezoelectric cylinder having an axial bore about a portion of the continuous integral single-mode fiber and cementing it in place to alter the relative phase difference between the bidirectionally transmitted beams by pulsing an electric field across the piezoelectric cylinder creating responsive radial deformations to change the refractive index of a portion of the continuous integral single-mode fiber to effect a $\pi/2$ phase shift of the light beam traveling in one direction and allowing the light beam traveling in the opposite direction to pass unshifted to create relative $\pi/2$ phase biasing between them.

* * * * *